United States Patent [19]

Foster

[11] 4,352,499

[45] Oct. 5, 1982

[54] HYDRAULIC PUMP WITH PISTON SEALING

[75] Inventor: Malcolm C. Foster, Wakefield, England

[73] Assignee: Fletcher Sutcliffe Wild Limited, United Kingdom

[21] Appl. No.: 97,986

[22] Filed: Nov. 28, 1979

[30] Foreign Application Priority Data

Nov. 28, 1978 [GB] United Kingdom ............... 46371/78

[51] Int. Cl.³ ............................................. F16J 15/48
[52] U.S. Cl. ............................. 277/59; 277/DIG. 6; 277/102; 277/124; 277/125; 308/36.1
[58] Field of Search ............ 277/59, 70, 102, 123–125, 277/228, DIG. 6; 308/36.1, 187.1, 187.2

[56] References Cited

U.S. PATENT DOCUMENTS

| 981,912 | 1/1911 | Brooke | 277/123 |
|---|---|---|---|
| 1,651,131 | 11/1927 | Joyce | 277/102 X |
| 2,150,529 | 3/1939 | Tremolada | 277/59 X |
| 2,374,960 | 5/1945 | Russell | 277/125 X |
| 2,815,970 | 12/1957 | Wallace | 277/58 |
| 2,898,867 | 8/1959 | Saalfrank | 277/124 X |
| 3,019,739 | 2/1962 | Prosser | 277/124 X |
| 3,096,070 | 7/1963 | Wolfensperger | 277/59 X |
| 3,325,173 | 6/1967 | Alt | 277/59 |
| 3,577,833 | 5/1971 | Skelton | 277/102 X |
| 3,785,659 | 1/1974 | Maurer et al. | 277/35 |
| 3,849,032 | 11/1974 | Mulvey et al. | 417/454 |
| 3,907,307 | 9/1975 | Maurer et al. | 277/124 X |
| 3,982,765 | 9/1976 | Fickelscher et al. | 277/53 |

FOREIGN PATENT DOCUMENTS

| 763306 | 7/1967 | Canada | 277/123 |
|---|---|---|---|
| 451385 | 10/1927 | Fed. Rep. of Germany . | |
| 2336147 | 7/1973 | Fed. Rep. of Germany . | |
| 1170338 | 1/1959 | France . | |
| 1456613 | 9/1966 | France | 277/59 |
| 1492563 | 7/1967 | France | 277/102 |
| 2103971 | 4/1972 | France . | |
| 2266010 | 10/1975 | France . | |
| 457482 | 11/1936 | United Kingdom | 277/59 |
| 1058192 | 2/1967 | United Kingdom | 277/59 |

Primary Examiner—Robert S. Ward, Jr.
Attorney, Agent, or Firm—Lowe, King, Price & Becker

[57] ABSTRACT

A reciprocable piston hydraulic pump is provided with a piston periphery sealing means 24 comprising, at the pressure side, a seal 25 of flexible material and adapted to surround the piston periphery, a ring 27 separating the seal 25 from a moulded pressure seal, with a reservoir 28 defined between the seal 25 and the pressure seal, and spring means 29 operable on the seal 25 to urge the latter towards the pressure seal 26.

11 Claims, 6 Drawing Figures

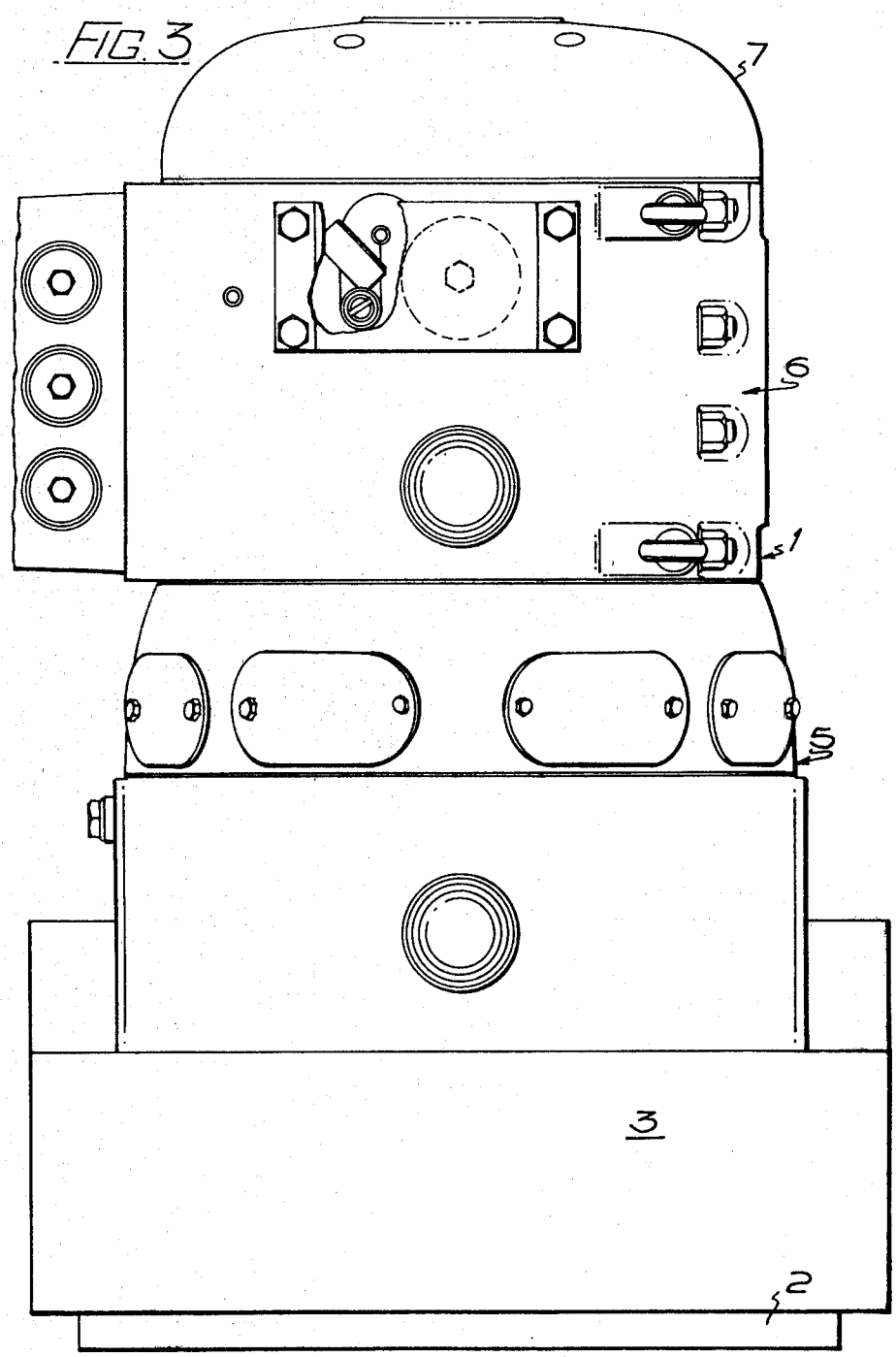

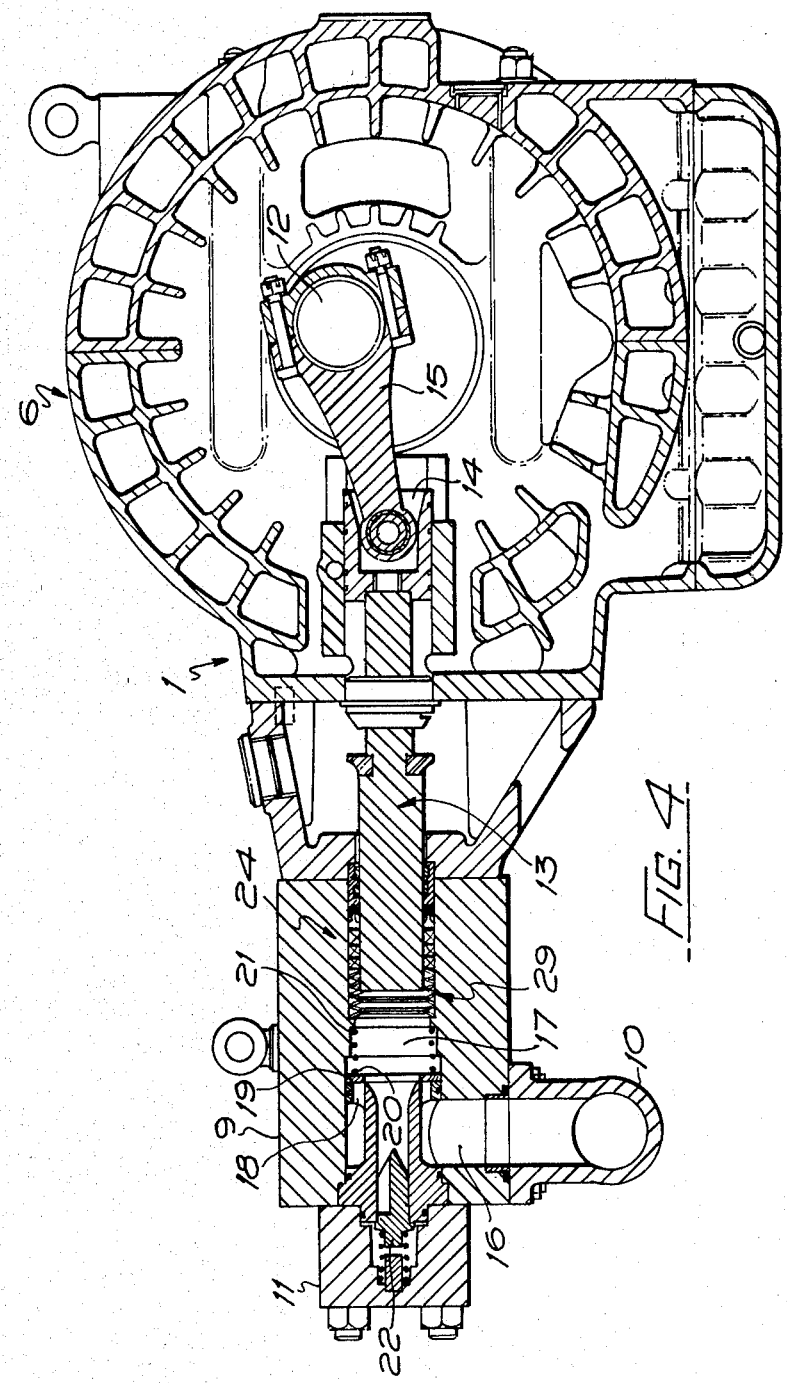

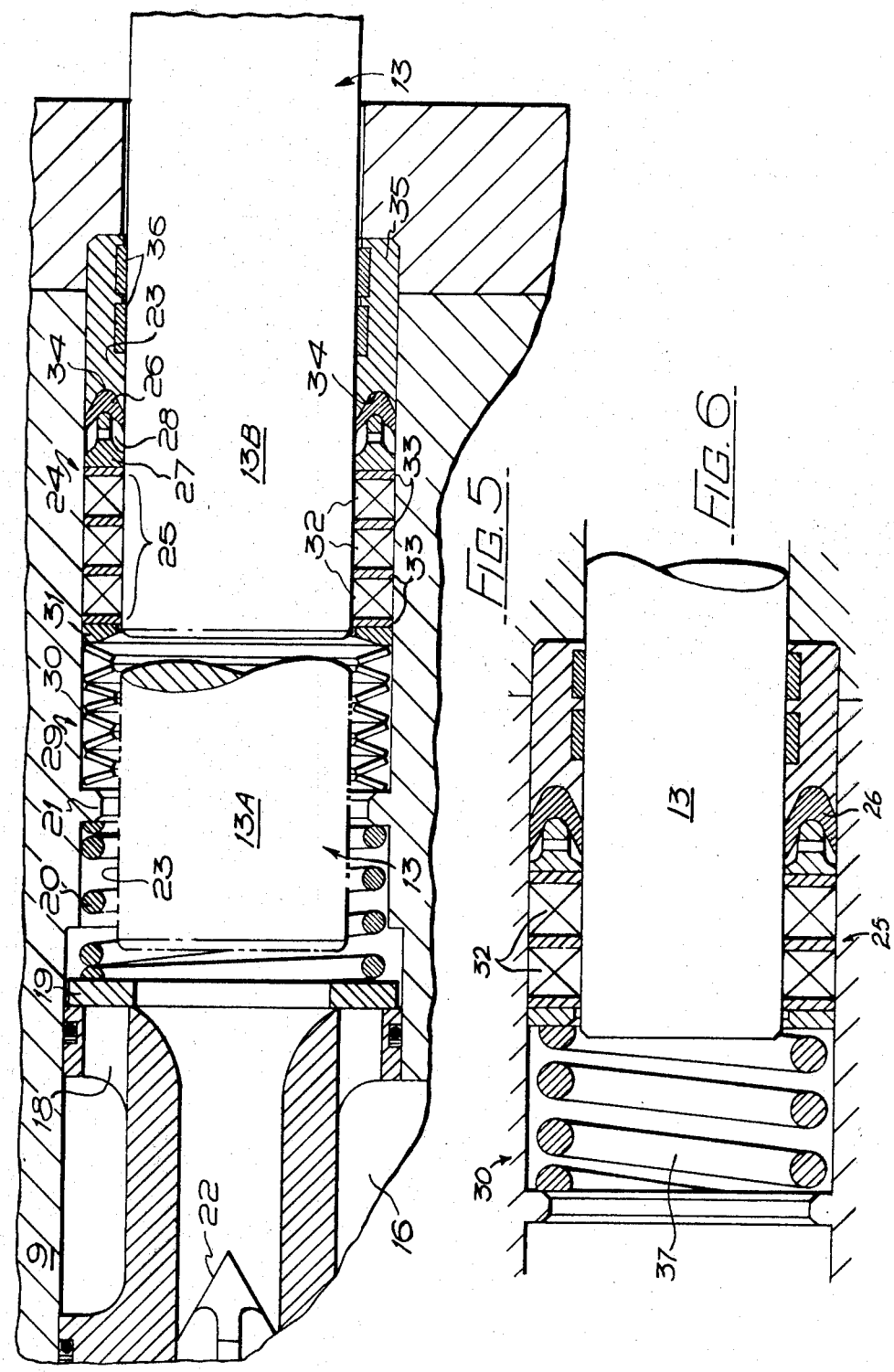

HYDRAULIC PUMP WITH PISTON SEALING

This invention relates to hydraulic pumps having at least one reciprocable piston and in particular to a seal arrangement for such a piston.

In one known construction the piston periphery has been sealed by a seal comprising a ring of rope/nature fibres, such a ring having a relatively long life but inherently having what has been regarded as an acceptable degree of leakage past the seal, the seal remaining clear of the piston periphery and the resulting annular gap being filled with the leaking fluid to give a lubricating effect, advantageous to the seal life. To provide lubrication at pump start-up it is also known to provide additionally an oil wick in contact with the piston periphery. Also, the pressure of the fluid being pumped tends to force the natural lubricant present in a rope/natural fibres seal away from the source of pressure, thereby reducing further the effectivness of this seal at its end adjacent the source of pressure, due to that end becoming "dry". With these and similar types of seal it has also been known to provide for seal adjustment to effect some control on the degree of leakage. However, it is not unknown for such seals to be over adjusted resulting in damage to the piston periphery and an attendant short seal life. However, with whatever form of seal embodies an acceptable degree of leakage, in pumps delivering fluid comprising an emulsion of 95% water and 5% soluble oil, such as is employed for the hydraulic roof supports of a coal face, leakage results in the disadvantageous deposition on the mine floor of relatively low flash point soluble oil.

As an alternative to this leaking type of seal, another known seal construction employs moulded sealing rings of synthetic plastics material intended to have total sealing effectiveness. However, cavitation occurs during the induction stroke inherent in pumps having relatively high piston speeds which has an adverse effect on the life of such seals, resulting in frequent seal changes and attendant down time of the pump.

According to the present invention, a reciprocable piston hydraulic pump is provided with a piston periphery sealing means comprising, at the pressure side, a first seal of flexible material and adapted to surround the piston periphery, a ring separating the first seal from a second seal having a moulded pressure seal, with a reservoir defined between the first seal and the pressure seal and spring means operable on the first seal to urge the latter towards the pressure seal.

The invention provides a sealing means of relatively long life whereby the first seal effects the greater part of the sealing action on the piston periphery, the minor part being effected by the moulded seal which in reality has only a wiping action on the piston periphery, the reservoir retaining fluid that has leaked past the first seal, which fluid remains available for lubricating the peripheral surface of the piston during displacement of the latter with respect to the first seal. For instance, a pump provided solely with a moulded pressure seal may have an average life of 500 hours, whereas a pump in accordance with the invention, where total sealing is effected with no floor spillage, has been found to have a life of at least 2,500 hours. Of course, upon initial installation of a first seal, there is indeed mutual contact but after a short time of operation, frictional contact is minimized.

Preferably, the first seal is a rope/natural fibres seal e.g. a RAMILON (Trade Mark) seal. Furthermore, it is also preferred to form the first seal from a plurality of individual annular elements separated from one another by spacer washers e.g. of P.T.F.E. This gives the advantage that the natural lubricant present in a rope/natural fibres seal is not forced by the pressure of the fluid being pumped from the end of the first seal remote from the moulded seal towards the latter. The number of individual elements employed and hence the effective axial length of the first seal is generally dependent upon the working pressures, the higher the pressures, the greater the number of elements. Preferably, the spring means comprises a plurality of Belleville washers, which advantageously avoids the need to provide adjustment means for seal pressure and also avoids the possibility of displacement of the seal assembly when no pressure is involved and the pump is unloading through an unloading valve. The reservoir may be defined by a headed metallic ring e.g. of bronze. The moulded seal is conveniently seated in an annular seating recess carried in a ring e.g. of Monel, surrounding the piston, the ring preferably being provided with bearing liners to aid piston guidance.

The invention will now be further described, by way of example, with reference to the accompanying drawings, in which:

FIG. 3 is a plan view of FIG. 2;

FIG. 4 is a section on the line IV—IV of FIG. 1;

FIG. 5 is a view to an enlarged scale of a portion of FIG. 4; and

Figure 1:
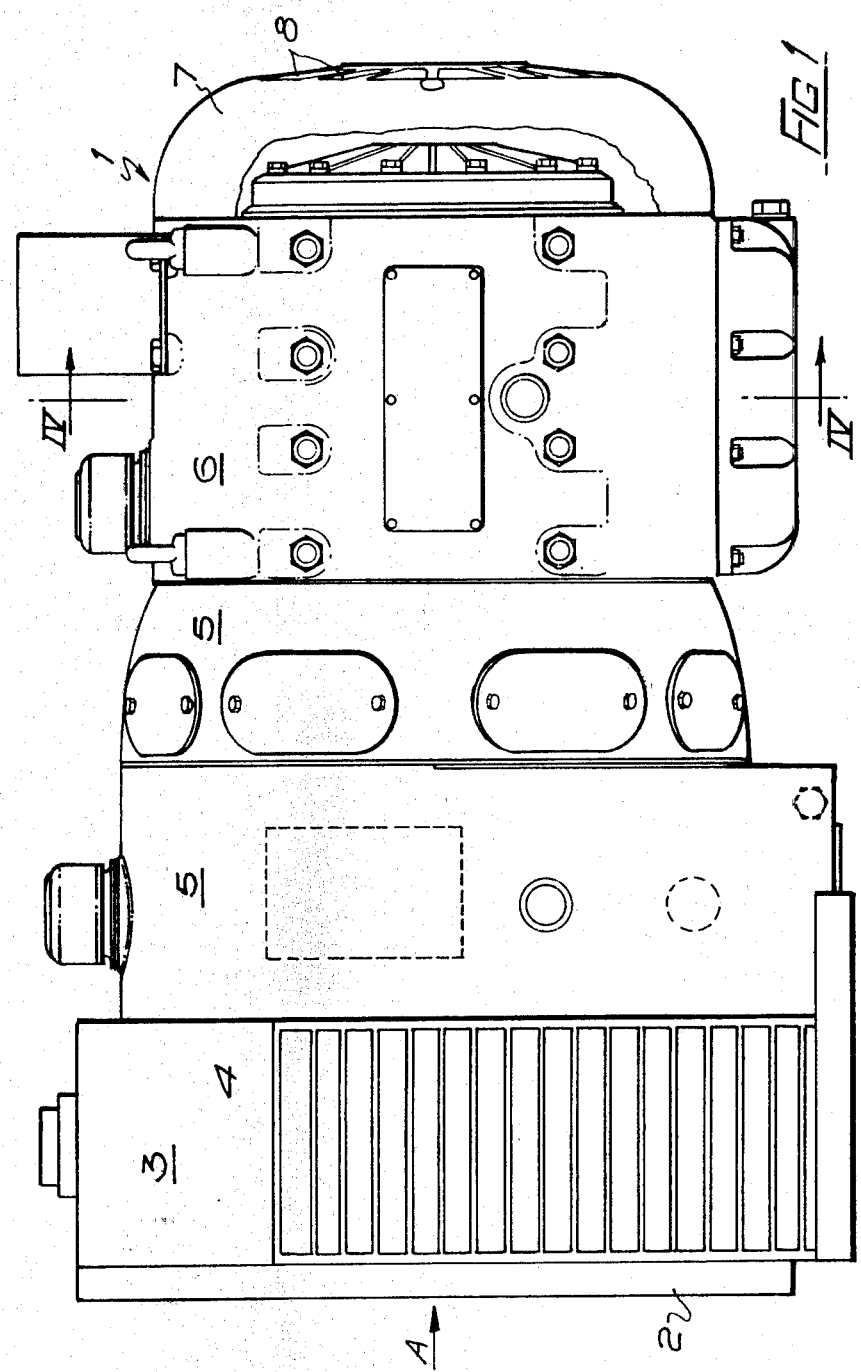
FIG. 1 is a side elevation of a hydraulic pump in accordance with the invention.
Figure 2:
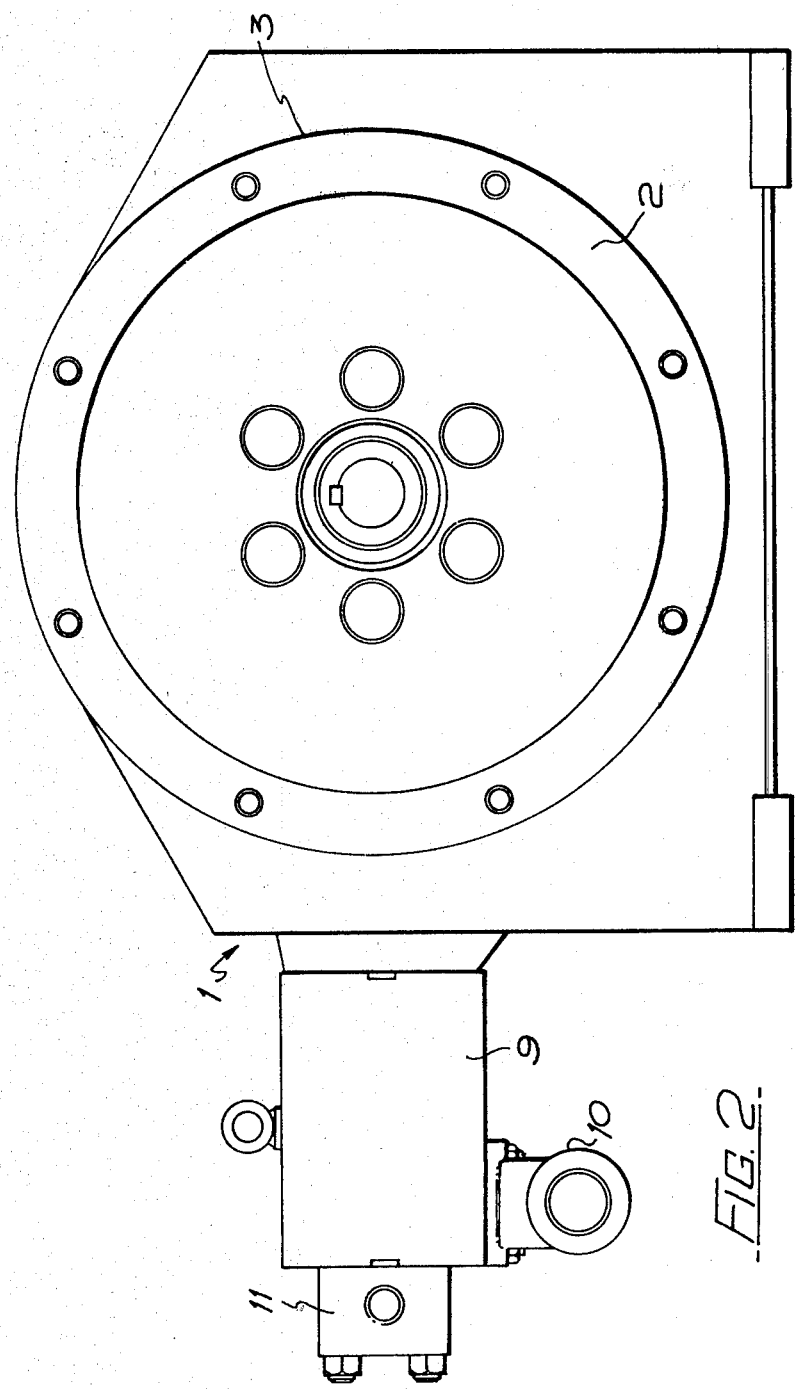
FIG. 2 is an end elevation of FIG. 1 in the direction of arrow A.

FIG. 6 corresponds to FIG. 5 but shows an alternative embodiment.

In the drawings, a pump 1 is provided at one side with a mounting flange 2 for an electric motor (not shown) the flange 2 being supported from a fan housing 3 provided with air louvres 4. The fan housing 3 is connected to a gearbox housing 5, which is in turn connected to a crank case 6. The latter terminates in a cover 7 having air inlet apertures 8 through which cooling air is drawn over the crank case and gearbox, to be expelled at the louvres 4 by the fan contained in the housing 3. The pump is also provided with a head block 9 on which is mounted a hydraulic fluid inlet manifold 10 connected to a source of hydraulic fluid supply, e.g. a sump, and a hydraulic fluid outlet manifold 11 connected to a source of hydraulic fluid use, e.g. a piston and cylinder unit.

Considering now FIG. 4, the crank case 6 houses a three-throw crank shaft 12 for three individual pistons 13 of the pump 1, one piston only being shown of course in FIG. 4. Each piston 13 is connected to the crankshaft 12 via a cross head 14 and a connecting rod 15. The inlet manifold 10 supplies hydraulic fluid to individual inlet ports 16 in the head block 9, this hydraulic fluid passing into the three working chambers 17 of the head block 9 through annular ports 18, each normally closed by a valve member 19 under the action of compression spring 20 abutting against one side of an inwardly directed flange 21. Fluid pumped by each piston 13 is discharged from the working chamber 17 beyond a spring loaded outlet valve 22 and into the outlet manifold 11.

As can best be seen in FIG. 5, the piston 13 has an outer position, at top dead centre of the crankshaft 12, indicated by portion 13A and an inner position, at bottom dead centre of the crankshaft 12, indicated by portions 13B, while external periphery 23 of the piston 13 is provided with a sealing means 24 comprising a first seal 25 and a moulded pressure seal 26 separated by a ring 27 of bronze which, together with the pressure seal 26 defines a reservoir 28. A spring means 29 constituted by a plurality of Belleville washers 30 abuts the opposite side of the flange 21 to that abutted by the spring 20, to urge the first seal 25 towards the second or pressure seal 26, with a pressure ring 31 interposed between the spring means 29 and the first seal 25. The first seal 25 consists of three individual, annular rings 32 of rope/natural fibres separated from one another, and from the rings 27 and 31 by P.T.F.E. washers 33. The second or pressure seal 26 is preferably of moulded synthetic plastics material and is located in an annular seating recess 34 in a Monel ring 35 surrounding the piston 13 and provided with two annular bearing liners 36 to aid guidance of the piston 13. The ring 27 is headed adjacent the seal 25 so that the reservoir 28 is adjacent the pressure seal 26.

In the embodiment of FIG. 6 the spring means 30 is constituted by a coil spring 37 while only two rings 32 make up the seal 25.

What I claim is:

1. A reciprocable piston hydraulic pump provided with a piston periphery sealing means comprising, at the pressure side, a first seal of flexible material surrounding said piston periphery, a second seal having a moulded pressure seal, a ring separating said first seal from said pressure seal, a reservoir defined between said first seal and said pressure seal, said spring means operable on said first seal to urge the latter towards said pressure seal.

2. A pump as claimed in claim 1, wherein said first seal is a rope seal.

3. A pump as claimed in claim 1, wherein said first seal is formed from a plurality of individual annular elements separated from one another by spacer washers.

4. A pump as claimed in claim 3, wherein said spacer washers are of P.T.F.E.

5. A pump as claimed in claim 1, wherein said spring means comprises a plurality of Belleville washers.

6. A pump as claimed in claim 1, wherein said reservoir is defined by a headed metallic ring.

7. A pump as claimed in claim 6, wherein said headed metallic ring is of bronze.

8. A pump as claimed in claim 1, comprising an annular seating recess carried in a ring, in which recess said pressure seal is seated.

9. A pump as claimed in claim 8, wherein said ring is of Monel.

10. A pump as claimed in claim 8, wherein said ring is provided with bearing liners to aid piston guidance.

11. A pump as claimed in claim 1, wherein said first seal is a natural fibre seal.

* * * * *